(12) United States Patent
Kanaris

(10) Patent No.: US 7,753,193 B2
(45) Date of Patent: Jul. 13, 2010

(54) KEY SPROCKET DRIVE SYSTEM

(75) Inventor: Alexander D. Kanaris, Richmond Hill (CA)

(73) Assignee: Van Der Graaf, Inc., Brampton (CA)

( * ) Notice: Subject to any disclaimer, the term of this patent is extended or adjusted under 35 U.S.C. 154(b) by 22 days.

(21) Appl. No.: 11/778,996

(22) Filed: Jul. 17, 2007

(65) Prior Publication Data
US 2008/0011586 A1 Jan. 17, 2008

Related U.S. Application Data

(63) Continuation of application No. 10/964,668, filed on Oct. 15, 2004, now Pat. No. 7,244,205.

(51) Int. Cl.
B65G 23/00 (2006.01)
B65G 23/06 (2006.01)
B65G 23/14 (2006.01)

(52) U.S. Cl. ..................... 198/834; 196/835; 196/832

(58) Field of Classification Search ............... 198/834, 198/835
See application file for complete search history.

(56) References Cited

U.S. PATENT DOCUMENTS

| | | | |
|---|---|---|---|
| 4,030,165 A | 6/1977 | Schmitt et al. | |
| 4,031,769 A | 6/1977 | Kassing | |
| 4,072,062 A | 2/1978 | Morling et al. | |
| 4,433,776 A | 2/1984 | Edwards, Jr. et al. | |
| 4,507,137 A | 3/1985 | Edwards, Jr. et al. | |
| 5,074,827 A | 12/1991 | Bandy, Jr. | |
| 5,213,001 A | 5/1993 | Gruettner et al. | |
| 5,322,478 A | 6/1994 | Bos et al. | |
| 5,389,044 A | 2/1995 | Bandy, Jr. et al. | |
| 5,469,958 A | 11/1995 | Gruettner et al. | |
| 5,702,316 A | 12/1997 | Cole | |
| 5,848,947 A | 12/1998 | Fornasiere et al. | |
| 5,934,447 A * | 8/1999 | Kanaris | 198/834 |
| 6,019,443 A | 2/2000 | Freeman | |
| 6,074,316 A * | 6/2000 | Murrietta, Sr. | 474/96 |
| 6,086,495 A | 7/2000 | Stebnicki et al. | |
| 6,109,227 A | 8/2000 | Mott | |
| 6,146,299 A | 11/2000 | Harvey | |
| 6,231,136 B1 | 5/2001 | Freeman | |
| 6,253,633 B1 | 7/2001 | Mott | |
| 6,508,524 B2 | 1/2003 | Rutz et al. | |

(Continued)

Primary Examiner—Gene Crawford
Assistant Examiner—Yolanda Cumbess
(74) Attorney, Agent, or Firm—Hoffmann & Baron, LLP

(57) ABSTRACT

A key sprocket drive system for a conveyor belt having a drive drum having an outer surface. The outer surface of the drive drum is adapted to engage a securement means. A contoured collar has an inner surface and an outer surface. The contoured collar is adapted to receive the securement means and adapted to engage the outer surface of the drive drum at predetermined positions therefore providing defined gaps between the inner surface of the contoured collar and the outer surface of the drive drum. The key sprocket drive system further comprises a sprocket member having a generally annular configuration with externally facing teeth-like protrusions at spaced intervals. The sprocket member is adapted to receive the securement means whereby the securement means engage the sprocket member and the contoured collar to secure the sprocket member and the contoured collar to the drive drum. The teeth-like protrusions engage the conveyor belt so as to drive the conveyor belt.

11 Claims, 4 Drawing Sheets

U.S. PATENT DOCUMENTS

| | | |
|---|---|---|
| 6,543,609 B2 | 4/2003 | Layne et al. |
| 6,758,776 B2 | 7/2004 | Fye et al. |
| 7,210,573 B2 * | 5/2007 | Mol .......................... 198/847 |
| 7,244,205 B2 * | 7/2007 | Kanaris ...................... 474/152 |
| 2001/0049313 A1 | 12/2001 | Rutz et al. |
| 2003/0141125 A1 | 7/2003 | Wahl |
| 2006/0084540 A1 * | 4/2006 | Kanaris ...................... 474/152 |

* cited by examiner

KEY SPROCKET DRIVE SYSTEM

FIELD OF THE INVENTION

This invention relates in general to conveyor drive systems and more particularly to key sprocket drive system for driving a conveyor belt.

BACKGROUND OF THE INVENTION

Conveyor drive systems are found in a wide variety of industries, as they are an important part of materials handling in all types of manufacturing. Sprockets are an integral part of the conveyor drive system, and as such make up a large part of the prior art. One particular issue is the securement of the sprocket on to drive drum so as to control the movement of the conveyor belt. Another issue is the wear of the sprocket as a result of the continuous engagement maintained with the conveyor belt.

Prior art conveyor drive systems have been devised to address the aforenoted problems. For example, U.S. Patent application 2003/0144098 discloses a split sprocket assembly, related apparatus and a method of mounting a sprocket to a rotatable structure such as a drive or idler drum. The sprocket assembly is comprised of at least three sections or segments each of which is secured to the adjacent section by a fastener such as a tangentially-extending bolt and nut combination. The sprocket assembly includes a plurality of receivers each for receiving a key that corresponds to a keyway formed in the rotatable structure.

U.S. Pat. No. 5,934,447 issued Aug. 10, 1999 to Kanaris discloses a roller drive sprocket system in which a drive roller mounts sprockets for driving a belt, and having a general cylindrical drive drum, semi-cylindrical grooves formed axially along the surface of the drive drum, sprockets formed of plastic with drive teeth for driving a belt, cylindrical metal keys located in the sprockets, spaced radially the keys fitting in the semi-cylindrical grooves in the surface of the cylindrical drive drum, portions of the keys extending inwardly to inter-engage with the semi-cylindrical grooves. U.S. Pat. No. 5,934,447 does not disclose a contoured collar adapted to engage the outer surface of the drive drum at predetermined points and thereby form predefined gaps between the drive drum and the contoured collar.

Thus a key sprocket drive system for driving a conveyor belt which has improved securement of the sprocket to the drive drum, and has predefined gaps that allows for improved expansion coefficients for the overall system thereby reducing wear of the key sprocket system is desirable.

SUMMARY OF THE INVENTION

An object of one aspect of the present invention is to provide an improved key sprocket drive system.

In accordance with one aspect of the present invention there is provided a key sprocket drive system for a conveyor belt having a drive drum having an outer surface. The outer surface of the drive drum may be adapted to engage a securement means. A contoured collar may have an inner surface and an outer surface. The contoured collar may be adapted to receive the securement means. Furthermore, the contoured collar may also be adapted to engage the outer surface of the drive drum at predetermined points. The contoured collar may therefore provide defined gaps between the inner surface of the contoured collar and the outer surface of the drive drum.

The key sprocket drive system may further comprise of a sprocket member having a generally annular configuration with externally facing teeth-like protrusions at spaced intervals. The sprocket member may be adapted to receive the securement means whereby the securement means may engage the sprocket member and the contoured collar to secure the sprocket member and the contoured collar to the drive drum. The teeth-like protrusions may then engage the conveyor belt so as to drive the conveyor belt.

Conveniently, the securement means may be better defined as a single key system further comprising at least two set screws that may engage a drive pin that engages an axial groove located along the outer surface of the drive drum. Preferably, the contoured collar may be made from metal and the drive drum made from metal where as the sprocket may be made from plastic.

Advantages of the present invention are: the defined gap created by the contoured collar allows for changes in the coefficient of expansion between the drive drum and contoured collar, which reduces wear on the entire key sprocket system; the shape of the contoured collar allows for the contoured collar to seat at specific points on the drive drum, thereby not only creating the defined gaps but also provides improved securement of the contoured collar to the drive drum; and the securement means allows for the sprocket member and the contoured collar to be positively secured to the drive drum at one point.

BRIEF DESCRIPTION OF THE DRAWINGS

A detailed description of the preferred embodiment is provided herein below by way of example only and with reference to the following drawings, in which.

Figure 1:
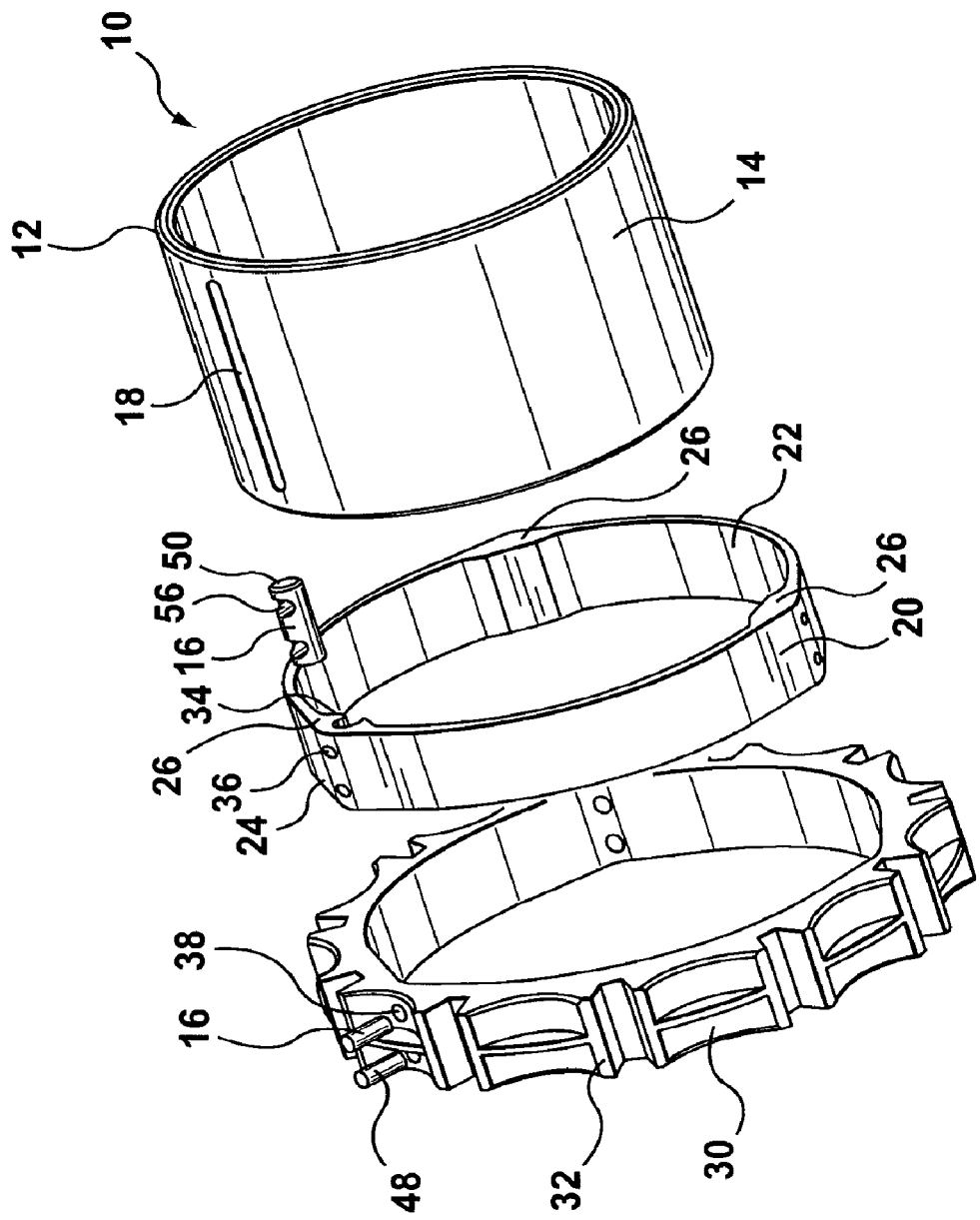
FIG. 1 in an exploded view, illustrates a key sprocket drive system for a conveyor belt in accordance with a preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 2:
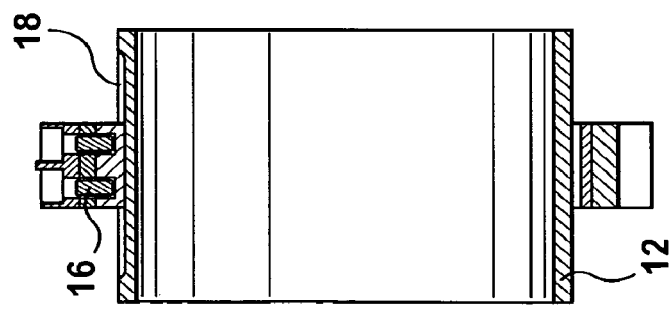
FIG. 2 in a cross-sectional view along the line 2-2, illustrates the key sprocket drive system of FIG. 1.

Referring to FIGS. 1 and 2, there is illustrated in an exploded view, a key sprocket drive system for a conveyor belt 10 in accordance with the preferred embodiment of the present invention. The key sprocket drive system for a conveyor belt 10 includes a drive drum 12 having an outer surface 14. The outer surface 14 of the drive drum 12 may be adapted to engage a securement means 16. More specifically, the drive drum 12 may be cylindrical in shape and may have at least one semi-circular or partial cylindrical groove 18 that runs axially along the outer surface 14 of the drive drum 12.

A contoured collar 20 may have an inner surface 22 and an outer surface 24. The contoured collar 20 may be adapted to receive the securement means 16. More specifically, the contoured collar 20 may be shaped so as engage the outer surface 14 of the drive drum 12 at predetermined positions or sections 26.

Figure 3:
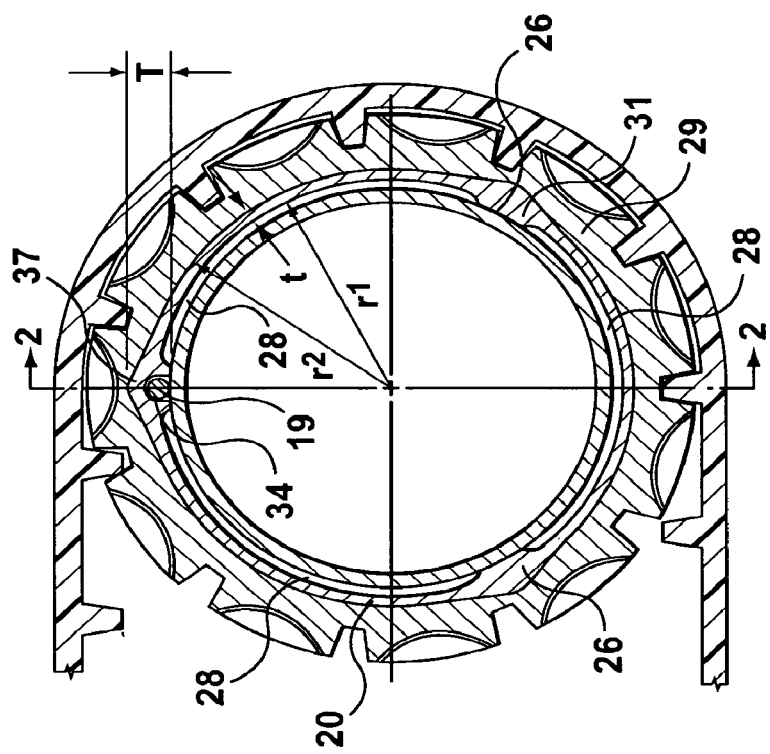
FIG. 3 in a cross-sectional view along the line 3-3, illustrates the key sprocket drive system of FIG. 1.

Referring to FIG. 3, the engagement of the contoured collar 20 at the predetermined positions or sections 26 results in the contoured collar 20 providing and defining gaps 28 between the inner surface 22 of the contoured collar 20 and the outer surface 14 of the drive drum 12. The defined gaps 28 between the contoured collar 20 and the outer surface 14 of the drive drum 12 allows for:

(a) easy cleaning of any debris, contaminants or other particles that may get lodged in the gap 28. For example, in the food industry any food particles trapped in the space 28 may be easily cleared by steam or the like;

(b) expansion to take place when the key sprocket drive system 10 is in operation.

More specifically, as the key sprocket drive system 10 is in operation, the metal of the contoured collar 20 and the metal of the drive drum 12 heat up causing the metal to expand or due to the coefficient of expansion of the metal at a rate generally different from each other and from the expansion of the sprocket which in one embodiment is comprised of plastic. The defined gaps 28 allow or accommodate the change in expansion of the metal and the plastic sprocket.

The contoured collar 20 may have a partial cylindrical or semi-circular groove 34 on the inside surface 22 of the contoured collar 20. Furthermore, the cylindrical groove 34 may be located in the pin receiving body portion 31 at one of the predetermined positions 26 so as to solidly contact the collar 20 on the drum 12 on an expanded area on the drum 12 rather than on a point or line. Moreover, the outer surface 24 of the contoured collar 20 may have at least two openings 36 (FIG. 1) adapted to receive the securement means 16. The contoured collar 20 may be made of metal.

Figure 4:
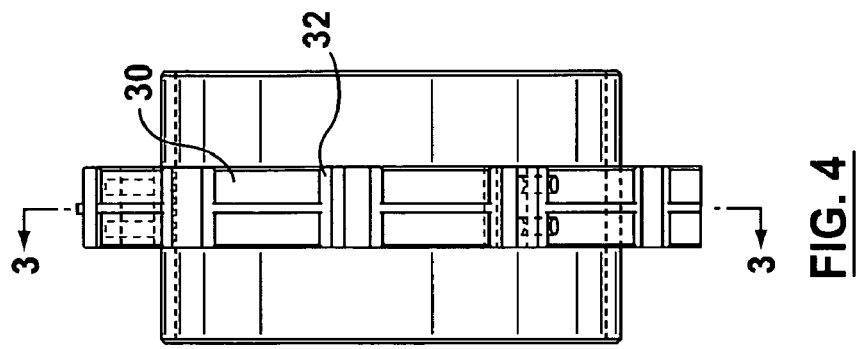
FIG. 4 in a bottom plan view, illustrates the key sprocket drive system of FIG. 1.
Figure 7:
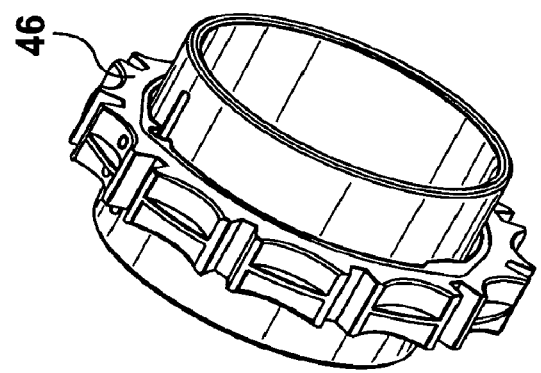
FIG. 7 in a perspective view, illustrates the key sprocket drive system of FIG. 1.
Figure 6:
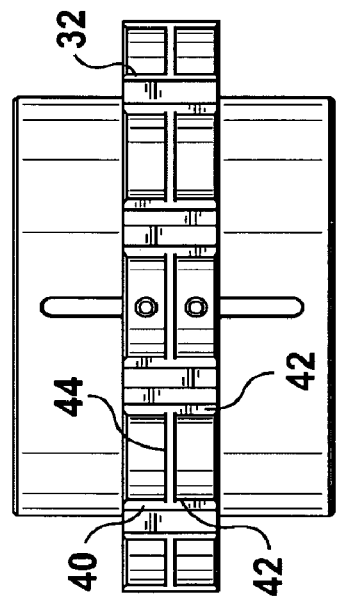
FIG. 6 in a top plan view, illustrates the key sprocket drive system of FIG. 1.
Figure 5:
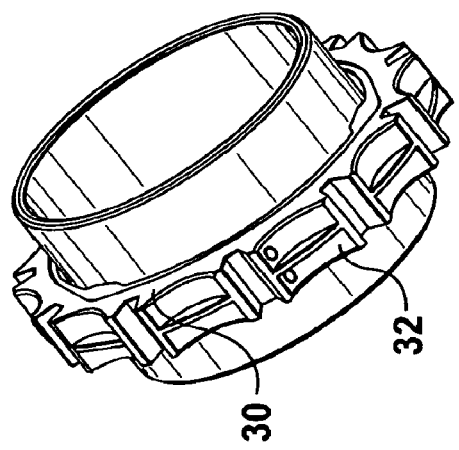
FIG. 5 in a perspective view, illustrates the key sprocket drive system of FIG. 1.
Figure 8:
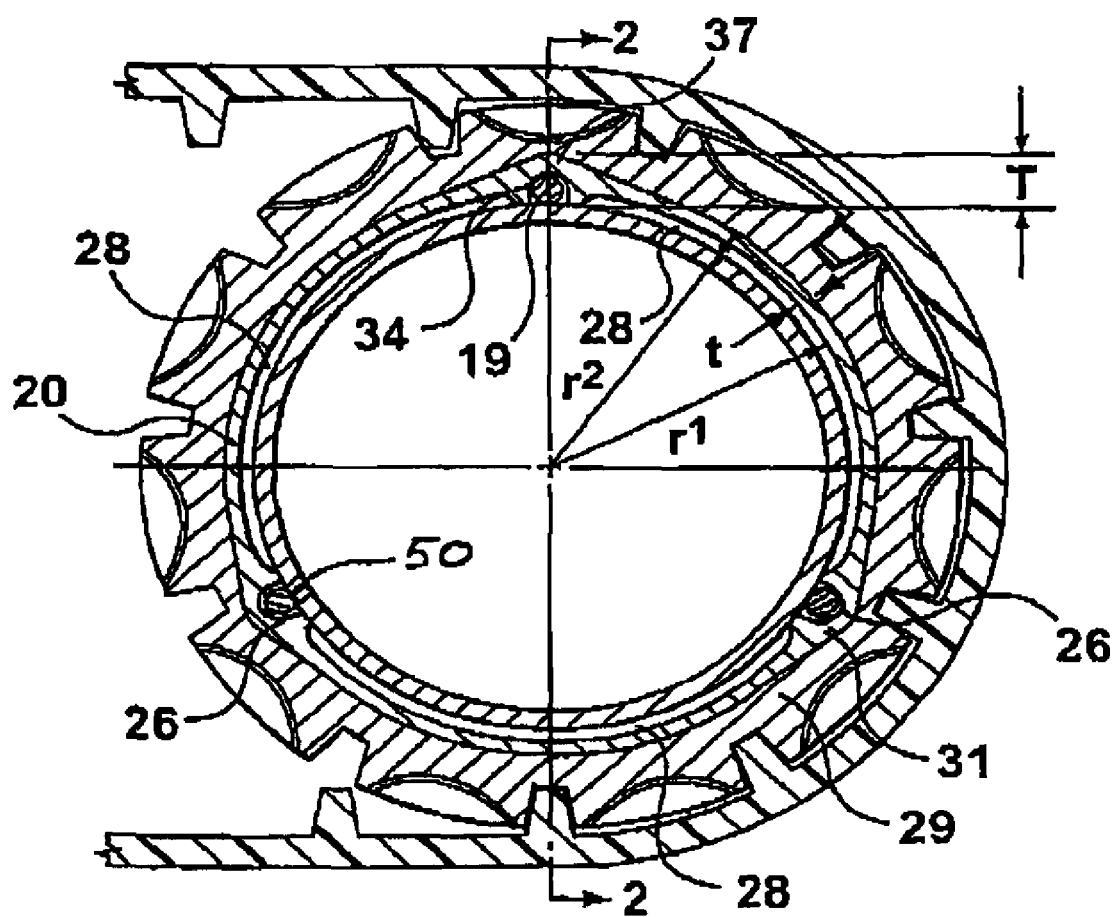
FIG. 8 in a cross-sectional view along the line 2-2, illustrates the key sprocket drive system of FIG. 1.

Referring to FIGS. 4, 5 and 6 the key sprocket drive system 10 may further comprise of a sprocket member 30 having a generally annular configuration with externally facing teeth-like protrusions 32 at spaced intervals. The sprocket member 30 may be adapted to receive the securement means 16. More specifically, the sprocket member 30 may have at least two opening 38 adapted to receive the securement means 16. The teeth-like protrusions 32 may be further defined as U-shaped teeth 40 having two arms 42 and a partition 44 running between each arm 42. The sprocket member 30 may be further defined as a plurality of sprockets 46 (FIG. 7).

The securement means 16 may be further defined as a single key system 47 having at least one set screws 48 and a drive pin 50. In the embodiment shown, two set screws 48 are shown. The securement means 16 may engage the sprocket member 30 and the contoured collar 20 to secure the sprocket member 30 and the contoured collar 20 to the drive drum 12. The teeth-like protrusions 32 may then engage the conveyor belt so as to drive the conveyor belt.

More specifically, in assembly, the set screws 48 are threaded through the openings 38 of the sprocket member 30 and the opening 36 of the contoured collar 20 to engage the drive pin 50. The drive pin 50 may be cylindrical in shape and have at least two opening 52 that receive the set screws 48. Furthermore, the drive pin 50 is positioned within the semi-circular grove 18 located on the outer surface 14 of the drive drum 12. The positioning of the drive pin 50 within the cylindrical groove 18 helps position the sprocket member 30 on the drive drum.

More particularly, the collar 20 is contoured so as to provide a longer thickness T in the vicinity of the drive pin 50 that the remainder of the collar t as shown so as to provide for solid securement of the securement means 16. In the embodiment shown in FIG. 1, the openings 36 may be threaded 37 since the collar 20 in one embodiment is comprised of metal The metal threads 37 receive the metal external threads of the set screws 48 which in turn are received by a metal threaded hole in the pin 50. Accordingly, solid securement is accomplished where most of the load is take up by the larger thickness T, the larger area of contact at 26, and the metallic securement, thereby extending the life of the generally plastic sprocket.

The contoured collar has an inner surface 22 of the first radius r, and a second outer surface 24 of a second radius $r_2$ greater than $r_1$, whereby at selected positions 29 the outer surface extends tangentially to define the pin receiving body portion 31. Accordingly, in one embodiment one pin 50 may be utilized. In another embodiment, three pins 50 may be utilized.

Furthermore, although the inner surface 22 is generally spaced from the drum, the inner surface 22 is generally in contact with or close to the drum 12 in the vicinity of the pin receiving body portion 31 so as to trap or capture the pin 16 between the circular grooves 18 and 19 of the pin and pin receiving body portion 31, respectively, minimizing the possibility the collar from floating away from the drum. The foregoing configuration allows the sprocket member 30 to be more securely mounted to the drive drum 12 thereby allowing the teeth 40 to engage the conveyor belt thereby being able to drive the conveyor belt. The key drive sprocket system 10 may have more than one securement means 16 located at the predetermined points 26 thereby providing increased securement of the sprocket member 30 to the drive drum 12.

In operation, the sprocket engages a belt of a conveyor system and any sideway wandering or vibration of the conveyor belt can be accommodated by the pint 50 moving axially within the grooves 18 of the drum 12.

Other variations and modifications of the invention are possible. All such modifications or variations are believed to be within the sphere and scope of the invention as defined by the claims appended hereto.

I claim:

1. A key sprocket drive system comprising:
   a. a drive roller having an inner surface and an outer surface;
   b. a contoured collar co-axially mounted to said drive roller, said collar comprising:
      i. an outer surface; and
      ii. an inner surface having a point of engagement extending therefrom;
   wherein said point of engagement is in contact with said outer surface of said drive roller and positions said inner surface of said contoured collar away from said outer surface of said drive roller to form a spaced apart region wherein the spaced apart region allows for cleaning of debris that may become entrapped between said outer surface of said drive roller and said inner surface of said contoured collar.

2. A key sprocket drive system comprising:
   a. a drive drum having a generally circular outer surface for rotation about an axis;

b. a key system having at least one set screw adapted to engage at least one drive pin, said at least one drive pin being positioned in an axial groove along said outer surface of said drive drum;

c. a contoured collar having an inner surface and an outer surface presenting at least one pin receiving body portion between said inner and outer surfaces at a selected position about said inner surface of said contoured collar, said at least one pin receiving body portion being adapted to receive said at least one set screw and contact said outer surface of said drive drum at a selected position, said at least one pin receiving body portion positioning said inner surface of said contour collar away from said outer surface of said drive drum, said positioning defining at least one gap between said inner surface of said contoured collar and said outer surface of said drive drum between said at least one pin receiving body portion wherein the gap allows for cleaning of debris that may become entrapped between said outer surface of said drive drum and said inner surface of said contoured collar; and d. a sprocket having a generally annular configuration with externally facing teeth at spaced intervals, said sprocket adapted to receive said at least one set screw.

3. A key sprocket drive system according to claim 2, wherein said key system has at least two set screws adapted to engage each said at least one drive pin.

4. A key sprocket drive system according to claim 2, wherein said at least one pin receiving body portion is adapted to receive at least two set screws.

5. A key sprocket drive system according to claim 2, wherein said contoured collar has an outer surface presenting at least two said pin receiving body portions between said inner and outer surfaces at selected positions about said inner surface, said pin receiving body portions are adapted to contact said outer surface of said drive drum at selected positions and gaps are defined between said inner surface of said contoured collar and said outer surface of said drive drum between said pin receiving body portions.

6. A key sprocket drive system according to claim 2, wherein said sprocket is adapted to receive at least two said set screws.

7. A key sprocket drive system for a conveyor belt comprising:

a. a drive drum having a generally circular outer surface for rotation about an axis;

b. a key system having at least one set screw adapted to engage at least one drive pin, said drive pin being positioned in an axial groove along said outer surface of said drive drum;

c. a contoured collar having an inner surface and an outer surface presenting at least one pin receiving body portion between said inner and outer surfaces at a selected position about said inner surface, said at least one pin receiving body portion being adapted to receive said at least one set screw and contact said outer surface of said drive drum at a selected position, said at least one pin receiving body portion positioning said inner surface of said contoured collar away from said outer surface of said drive drum, said positioning defining at least one gap between said inner surface of said contoured collar and said outer surface of said drive drum between said at least one pin receiving body portion wherein the gap allows for cleaning of debris that may become entrapped between said outer surface of said drive drum and said inner surface of said contour collar; and d. a sprocket having a generally annular configuration with externally facing teeth at spaced intervals, said sprocket adapted to receive said at least one set screw;

wherein said pin is capable of moving axially within said axial groove during operation.

8. A key sprocket drive system according to claim 7, wherein said key system has at least two set screws adapted to engage each said at least one drive pin.

9. A key sprocket drive system according to claim 7, wherein said at least one pin receiving body portion is adapted to receive at least two set screws.

10. A key sprocket drive system according to claim 7, wherein said contoured collar has an outer surface presenting at least two said pin receiving body portions between said inner and outer surfaces at selected positions about said inner surface, said pin receiving body portions are adapted to contact said outer surface of said drive drum at selected positions and gaps are defined between said inner surface of said contoured collar and said outer surface of said drive drum between said pin receiving body portions.

11. A key sprocket drive system according to claim 7, wherein said sprocket is adapted to receive at least two said set screws.

* * * * *